(12) United States Patent
Peeples

(10) Patent No.: US 6,574,905 B2
(45) Date of Patent: Jun. 10, 2003

(54) SHOCK-ABSORBING GAFF DEVICE

(76) Inventor: Jason W. Peeples, 1696 Walterboro Hwy., Varnville, SC (US) 29944

( * ) Notice: Subject to any disclaimer, the term of this patent is extended or adjusted under 35 U.S.C. 154(b) by 0 days.

(21) Appl. No.: 09/882,664

(22) Filed: Jun. 15, 2001

(65) Prior Publication Data

US 2002/0100207 A1 Aug. 1, 2002

Related U.S. Application Data

(63) Continuation-in-part of application No. 09/771,271, filed on Jan. 26, 2001, now abandoned.

(51) Int. Cl.[7] ................................................ A01K 97/14
(52) U.S. Cl. ............................................................ 43/5
(58) Field of Search ........................... 43/5, 6; 294/19.3, 294/26

(56) References Cited

U.S. PATENT DOCUMENTS

| | | | |
|---|---|---|---|
| 2,582,245 A | | 2/1952 | McRae |
| 3,955,302 A | * | 5/1976 | Tudisco ........................ 294/26 |
| 4,148,512 A | * | 4/1979 | Pendlebury .................. 294/26 |
| 4,169,330 A | * | 10/1979 | Schnur ............................. 43/5 |
| 4,739,573 A | | 4/1988 | Robertson |
| 4,885,862 A | * | 12/1989 | Thayer ........................... 43/34 |
| 5,171,052 A | * | 12/1992 | Cunningham .............. 294/19.1 |
| 5,704,156 A | * | 1/1998 | DiLello ...................... 294/19.3 |

* cited by examiner

Primary Examiner—Peter M. Poon
Assistant Examiner—Susan Piascik
(74) Attorney, Agent, or Firm—Stephen R. Chapman

(57) ABSTRACT

A gaff device used to land sport and commercial fish. The staff portion of the device comprises two separable sections which are releaseably joined by a manual latch device. The sections remain physically connected by a energy dissipating, shock absorbing, extendable/retractable element. A hook element is attached to the distal end of the device. The shock absorbing element dissipates energy from an impaled fish thereby reducing the chance of the hook pulling free and freeing the fish or the device being jerked from the user's hands. As the force generated by the movement of the fish is reduced, the handle section returns to its initial configuration. In addition, when unlatched and extended, the device provides a superior lever for landing a large fish compared with gaffs designed according to prior art. A second, major embodiment describes a gaff with a single staff that retains the shock absorbing capabilities and eliminates the manual releases.

2 Claims, 15 Drawing Sheets

SHOCK-ABSORBING GAFF DEVICE

Figure 1:
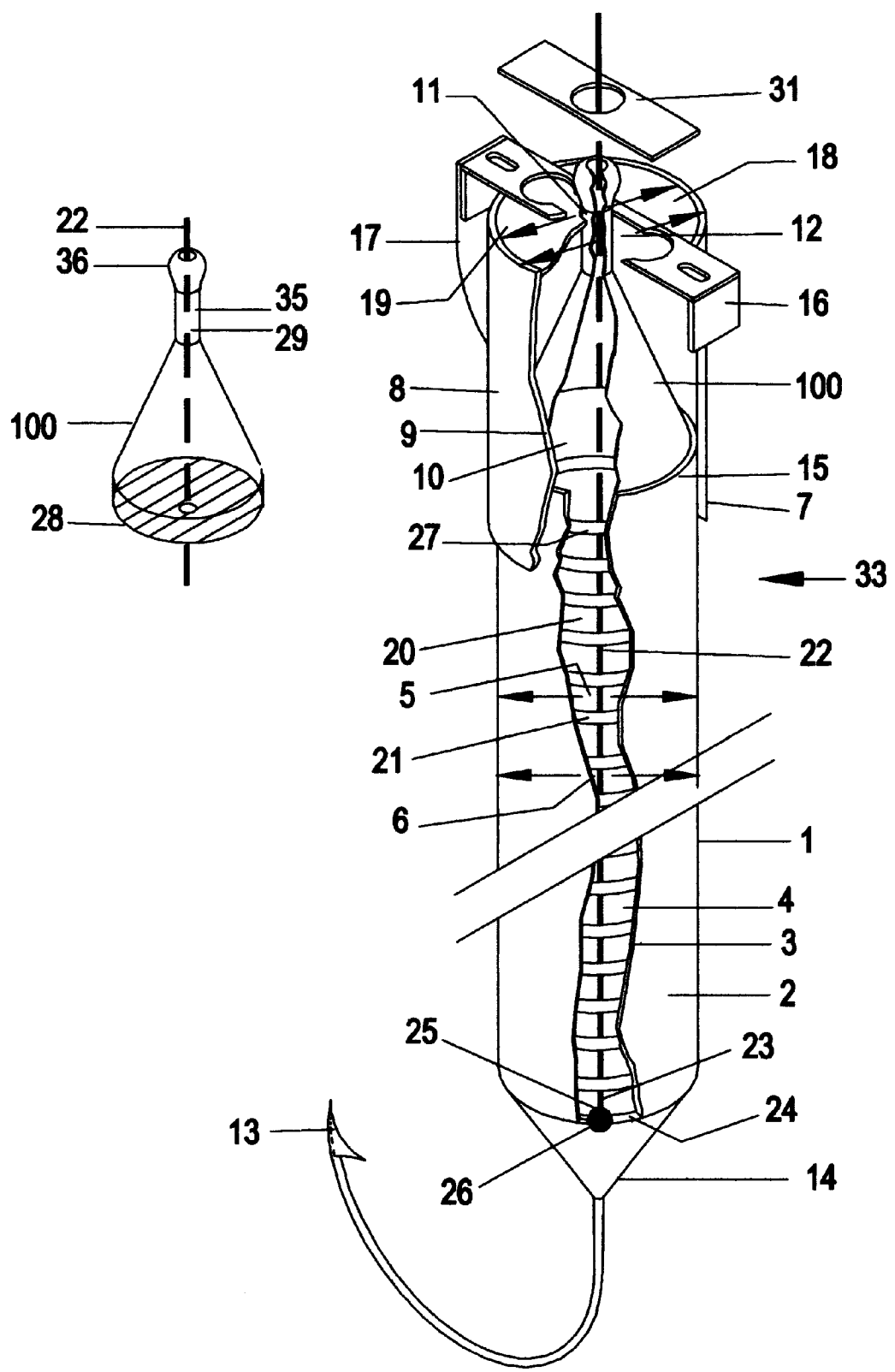

This invention this is a continuation-in-part of U.S. patent application Ser. No. 09/771,271, filed Jan. 26, 2001, now abandoned and which Patent Application is incorporated herein by reference in its entirety.

FIELD OF THE INVENTION

The device is a specialty item used in both sport and commercial fishing activities. It is used to assist in landing relatively large fish, most commonly fish taken by rod and reel techniques used in fishing from boats and fishing piers.

BACKGROUND OF THE INVENTION

The fishing gaff is not a new device. It has been used by sport and commercial fishermen for generations to assist the ultimate taking of fish that are too large and at times too dangerous to land using nets or simply unassisted by hand.

The traditional device is reflected accurately by devices most commonly used today. The basic device comprises two essential elements: a hook portion strongly fastened to a handle. In addition some devices are fitted with a simple lanyard. Most commonly both the handle and hook components are made of metal. Some devices have wooden handles, and some may have plastic handles, but the material has little effect on the use. The size and strength vary as a function of the intended use or type of fish anticipated to be taken. Length most commonly is 1.0 to 2.0 m and the diameter of the circle that describes the hook portion varies from rarely less than 5.0 cm to 15.0 cm. The devices are strong enough to land fish ranging in weight from less than 5 kg to over 100 kg. Lighter weight fish may be taken using a gaff, and at the upper weight limits, additional devices may be used in conjunction with gaffing.

The gaff is a classic hand held device. When a fish is played by rod and reel and ultimately brought to the boat or pier, a gaff may be used to hook or impale and control the fish and as a grip to lift the fish into the boat or onto the pier.

The basic function is to impale a fish on the hook of the gaff by swinging the gaff in a short arc and impaling or hooking a fish brought next to a boat or pier on a fishing line. This simple process fails when either the hook is not firmly imbedded in the fish and it pulls free when the fish struggles, the handle breaks as a result of pressure exerted by the fish in a struggle to free itself or the gaffed fish is not weak enough to be landed, and the gaff is pulled from the user's hands. In some instances, the gaff breaks at the handle when the user, in an effort to lift or otherwise control the fish, uses the gaff as a leaver against the side of the boat.

Failure is undesirable for a variety of reasons. Fish that have been impaled that escape as a result of dislodging the gaff hook, breaking the gaff handle or by pulling the gaff from the user's hands are frequently severely injured and left relatively defenseless in their return to their habitat. Obviously the fish is lost to the sportsman or commercial fisherman, and the gaff may be lost or destroyed. Both a potential trophy and a valuable piece of equipment may be lost with resulting expenses and inconvenience.

BRIEF DESCRIPTION OF THE INVENTION

Gaffs of prior art design frequently pull free from large fish when the impaled fish struggles. Struggling fish also may pull the gaff from the user's hands. The object of this invention is a shock absorbing gaff not known in the prior art that reduces the tendency for the gaff to pull free from an impaled fish and buffer struggling so as to reduce the tendency of the gaff to be pulled from the user's hands.

The shock absorbing gaff comprises the two basic components of a traditional, prior art gaff: a hook element and a staff element. The staff element comprises a lower handle unit and an upper handle unit. The upper handle unit is positioned over the proximal end of the lower handle unit such that the lower handle unit is partially inserted into the upper handle unit when the upper handle unit and lower handle units are in a locked or closed position or configuration. The lower handle unit can be separated from the upper handle unit by releasing a manual latch device positioned on the proximal end of the upper handle unit, or in an alternate mode, the releasable locking device may be positioned elsewhere on the upper handle unit. The release of said latch device in response to a struggling fish impaled on the hook attached to the distal end of said lower handle unit allows said lower handle unit to separate from said upper handle unit. A shock absorbing means connects said lower handle unit and said upper handle unit and by allowing said lower handle unit to move from said upper handle unit under resistance reduces the impact of the struggling fish and probability of the hook pulling free from said fish. The shock absorbing device also reduces the tendency of said gaff to be pulled from the user's hands.

In addition to the physical, shock absorbing function of the device that is activated when the lower handle unit is released from the upper handle unit, in this unlocked or released configuration, within a short range, the gaff device can be used to play the impaled fish by moving the upper handle unit alternately towards and away from the fish. Finally, in the released configuration, the device is significantly lengthened, and this alone reduces the need for the user to lean, stretch, and over-reach which at a minimum may be awkward and can lead to loss of equipment and personal injury.

As the struggle subsides, the shock absorbing device may exert a force to return the handle to its initial configuration thereby also bring the impaled fish within reach to land it, as intended. If the device is employed as a leaver, when too much force is exerted to lift the fish, before the handle breaks, the latch, if not previously released, may be released, and the fish is held securely, damage and injury from a broken gaff are minimized, and necessary steps to successfully land the fish may be taken.

More specifically the invention is directed to a device that sport and commercial fishermen use to assist in landing fish taken by rod and reel from boats and from the shore. The staff element of the device comprises two units which are locked together but can be released manually thereby allowing a shock absorbing mechanism positioned in the lower handle unit to dissipate energy of a struggling, impaled fish. The shock absorbing means reduces the probability of a fish pulling free of the hook and being lost, damaging the gaff, or pulling the gaff from the user's hands.

The invention also anticipates and claims a gaff device comprising a single staff element with shock absorbing capabilities.

BRIEF DISCUSSION OF THE DRAWINGS

FIG. 1 provides a longitudinal cross section view of the entire shock absorbing gaff device, illustrating the major functional units, their arrangement, and relative relationships when said gaff is in its locked or closed position.

Figure 2:
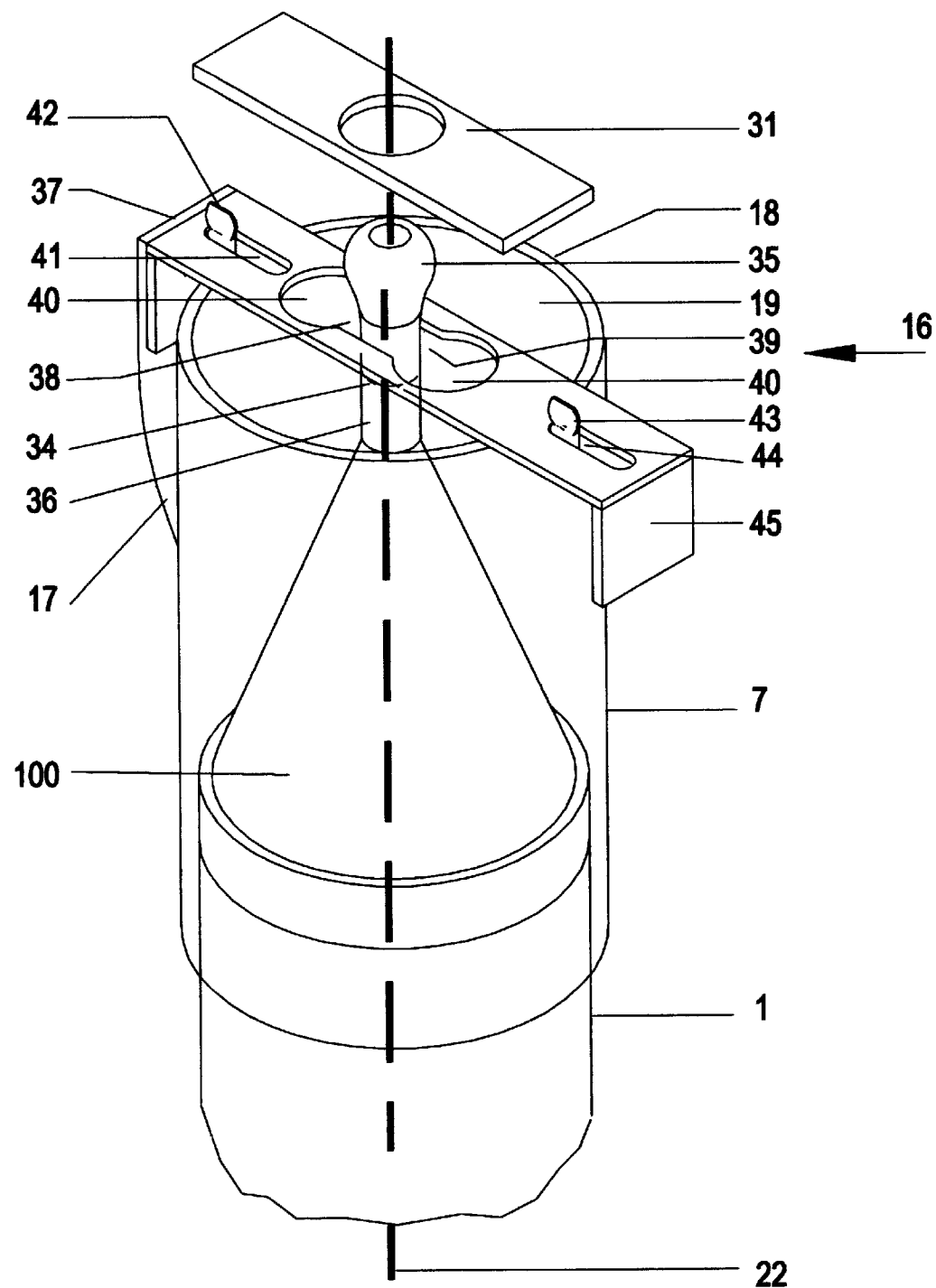

FIG. 2 provides a detailed view of the elements of the entire latch device when it is in a closed or locked position.

Figure 3:
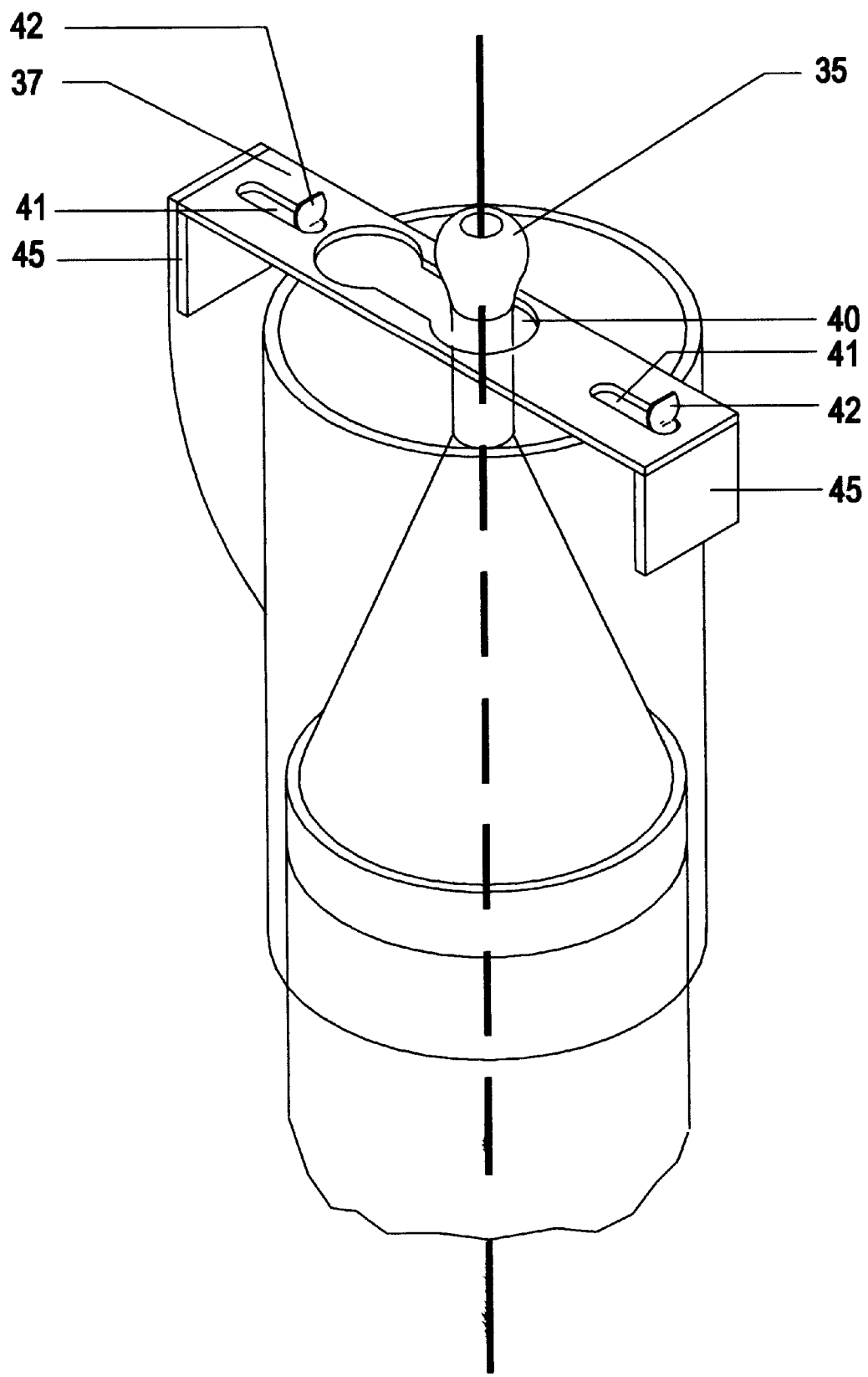

FIG. 3 is a longitudinal cross section view of the latch device in the open (unlocked) configuration.

Figure 4:
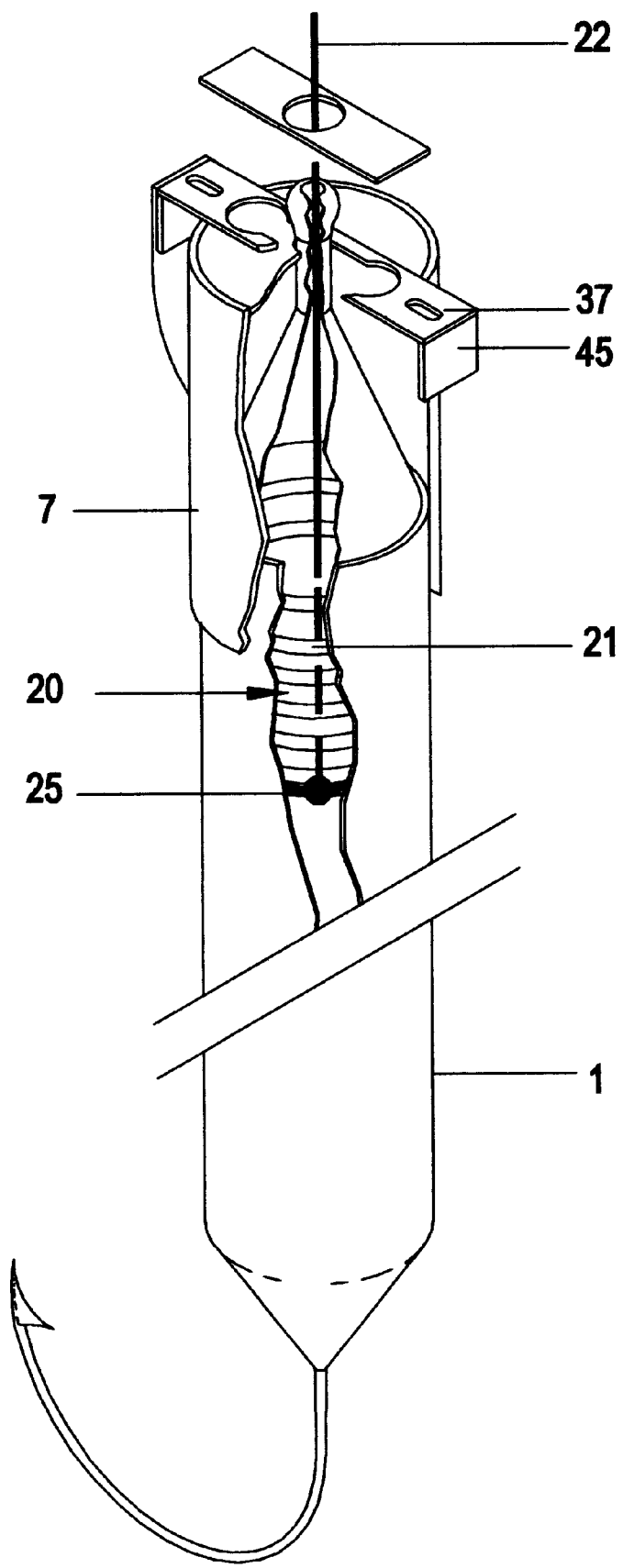

FIG. 4 provides a view of the arrangements of elements of said gaff device as they would appear when said lock is released and said lower handle unit separates from said upper handle unit.

Figure 5A:
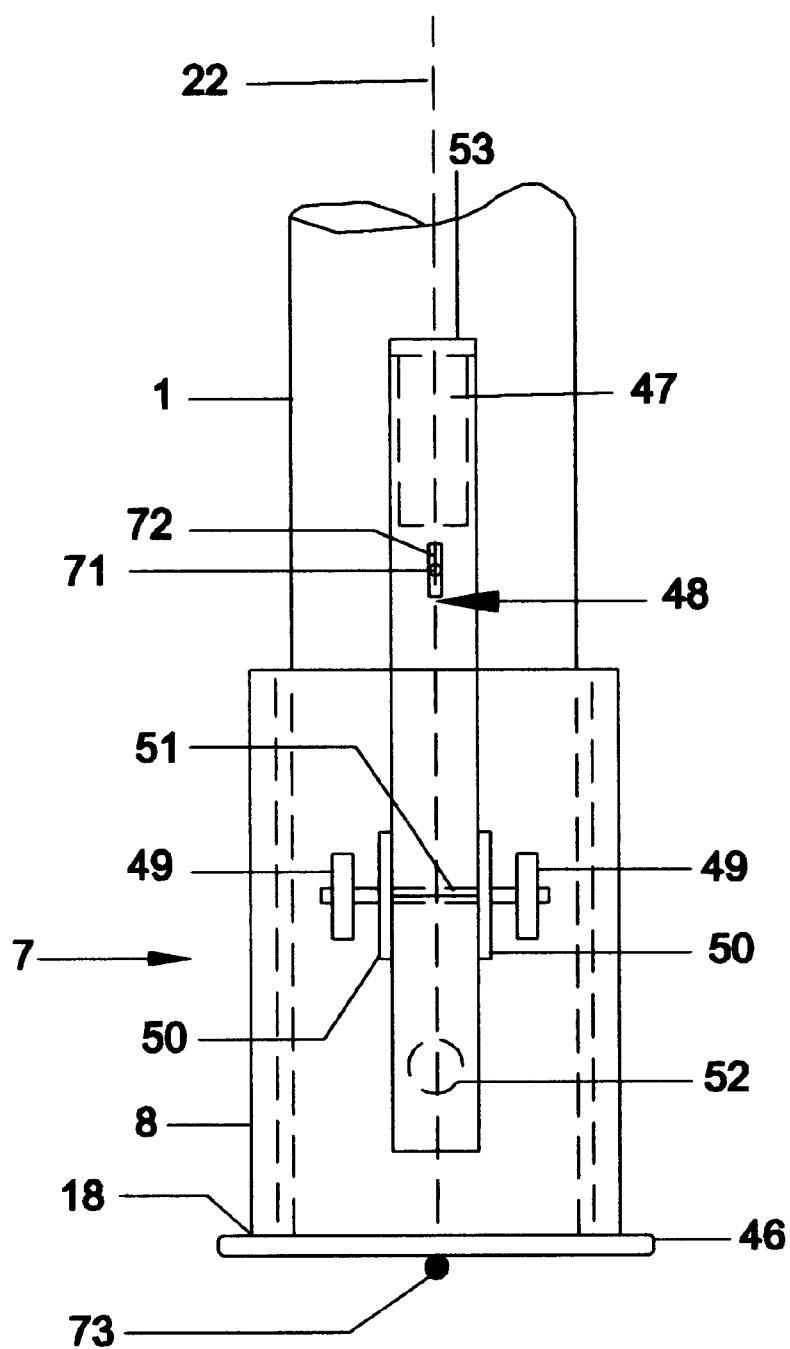
Figure 5B:
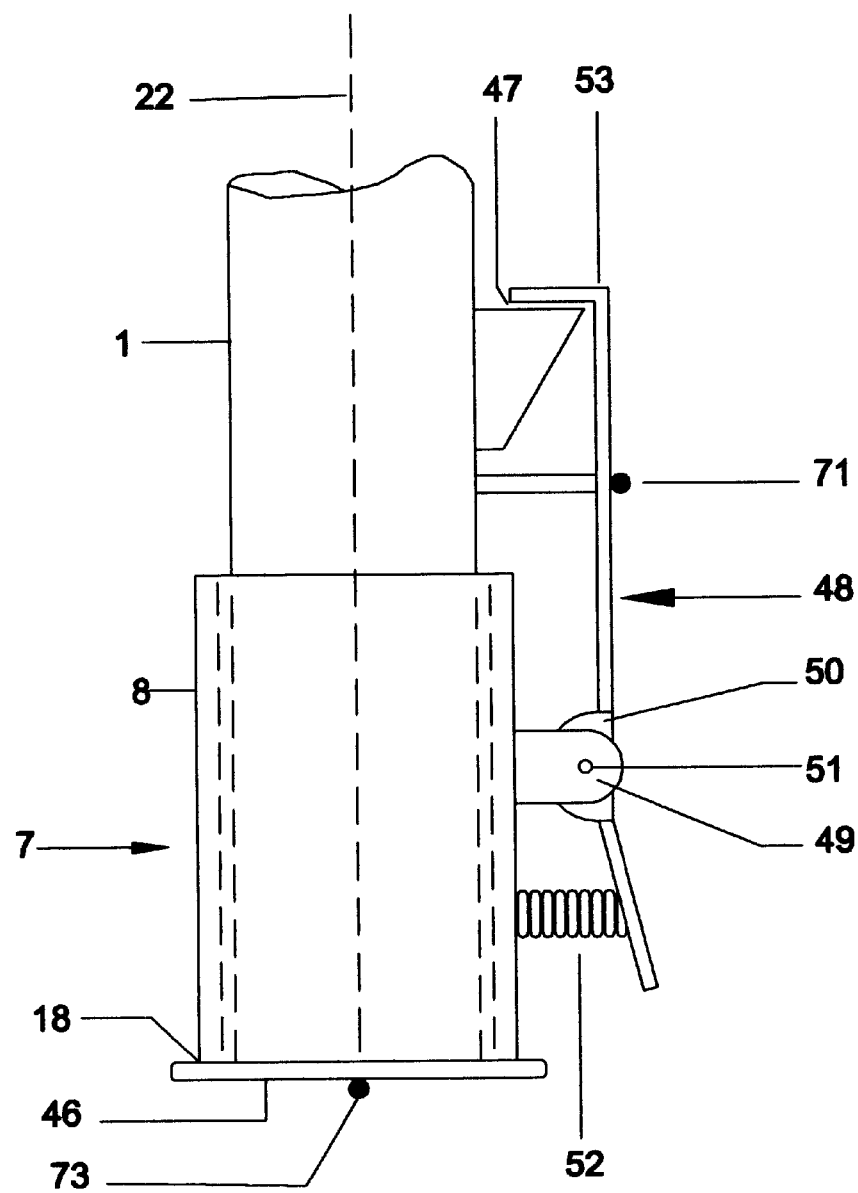

FIGS. 5A and 5B present views of an alternate latch device.

Figure 6A:
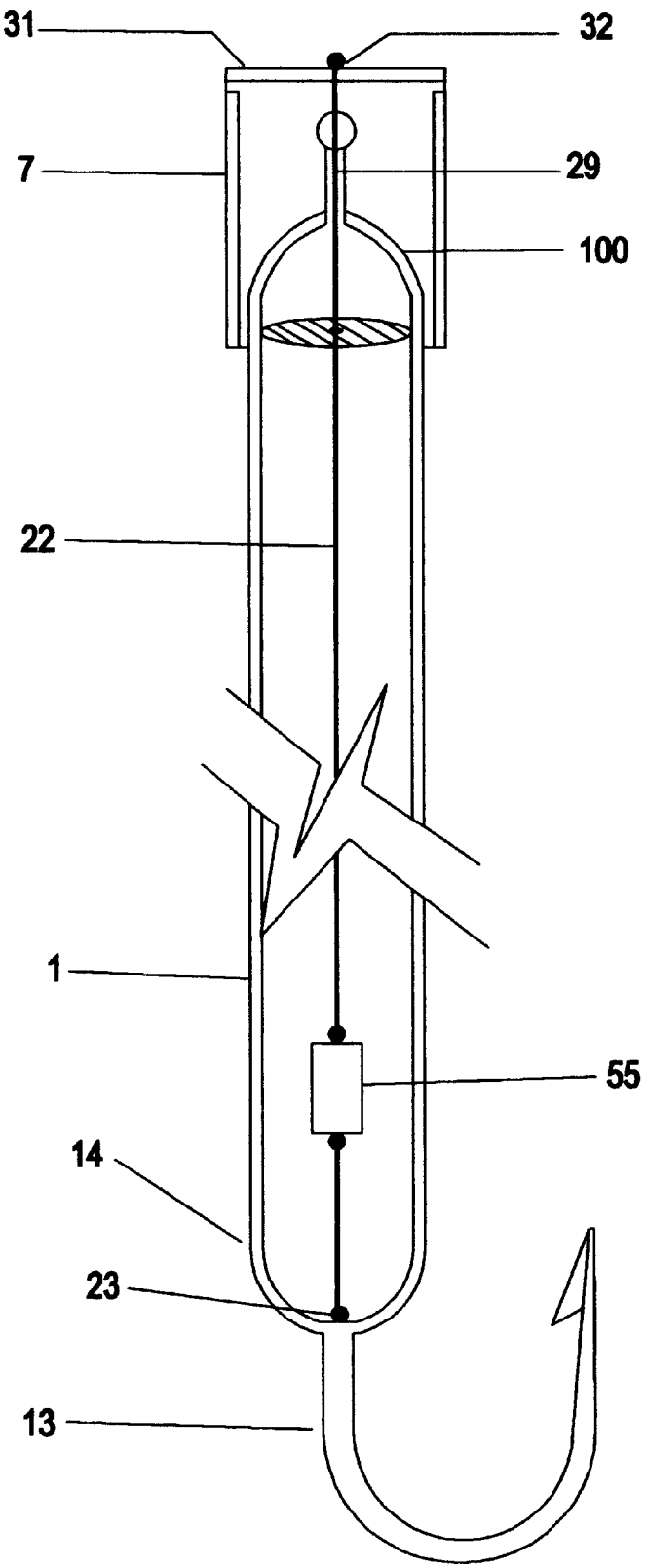
Figure 6B:
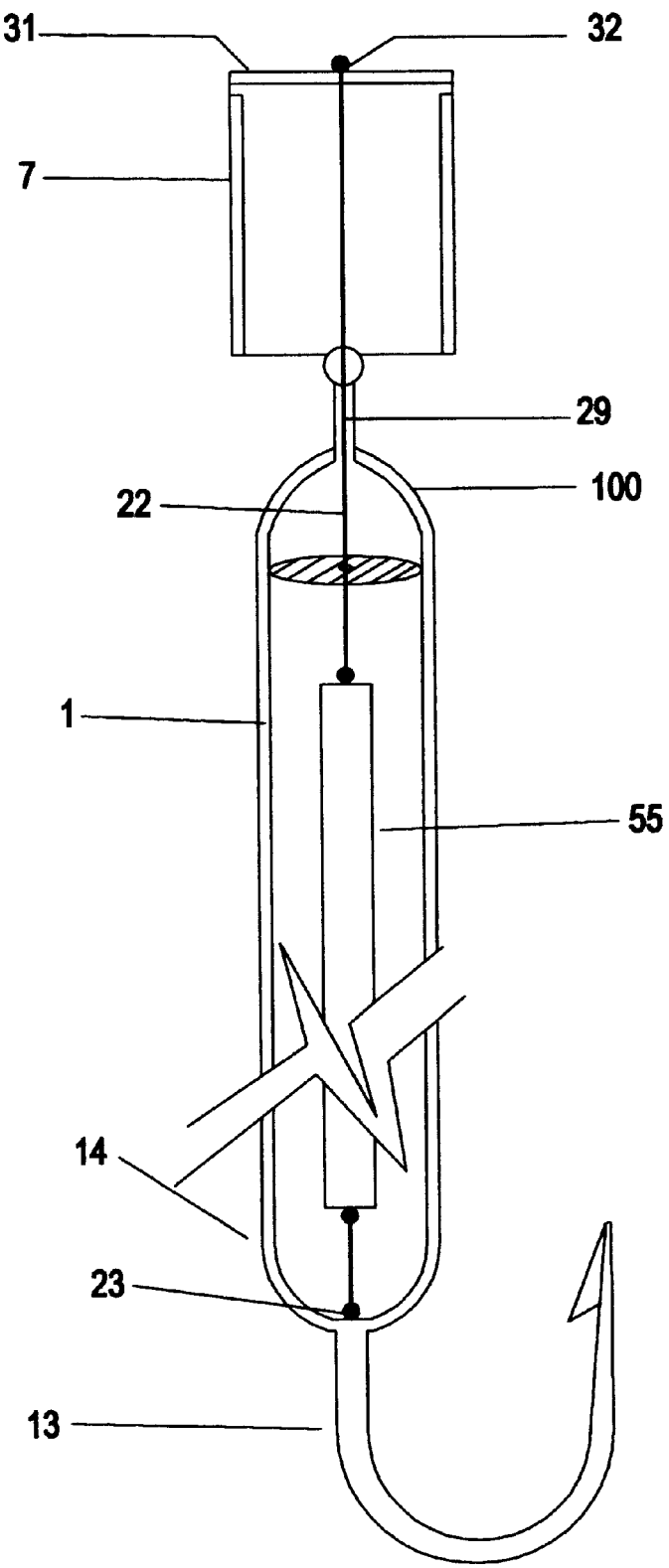
Figure 6C:
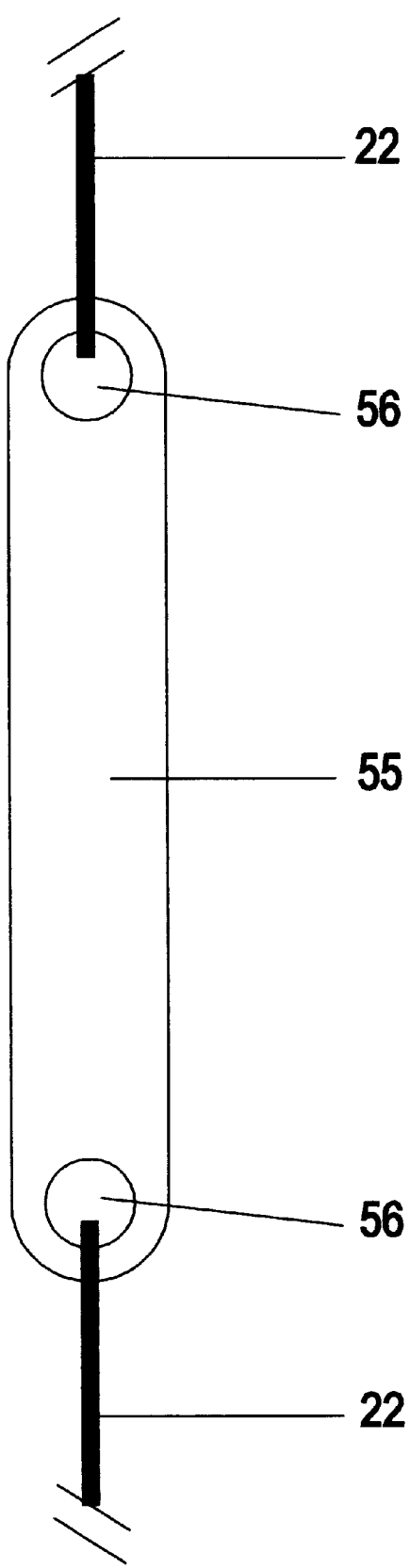

FIGS. 6A, 6B, and 6C illustrate an alternate shock absorbing means in which a stretchable material such as rubber is employed as a shock absorber.

Figure 7A:
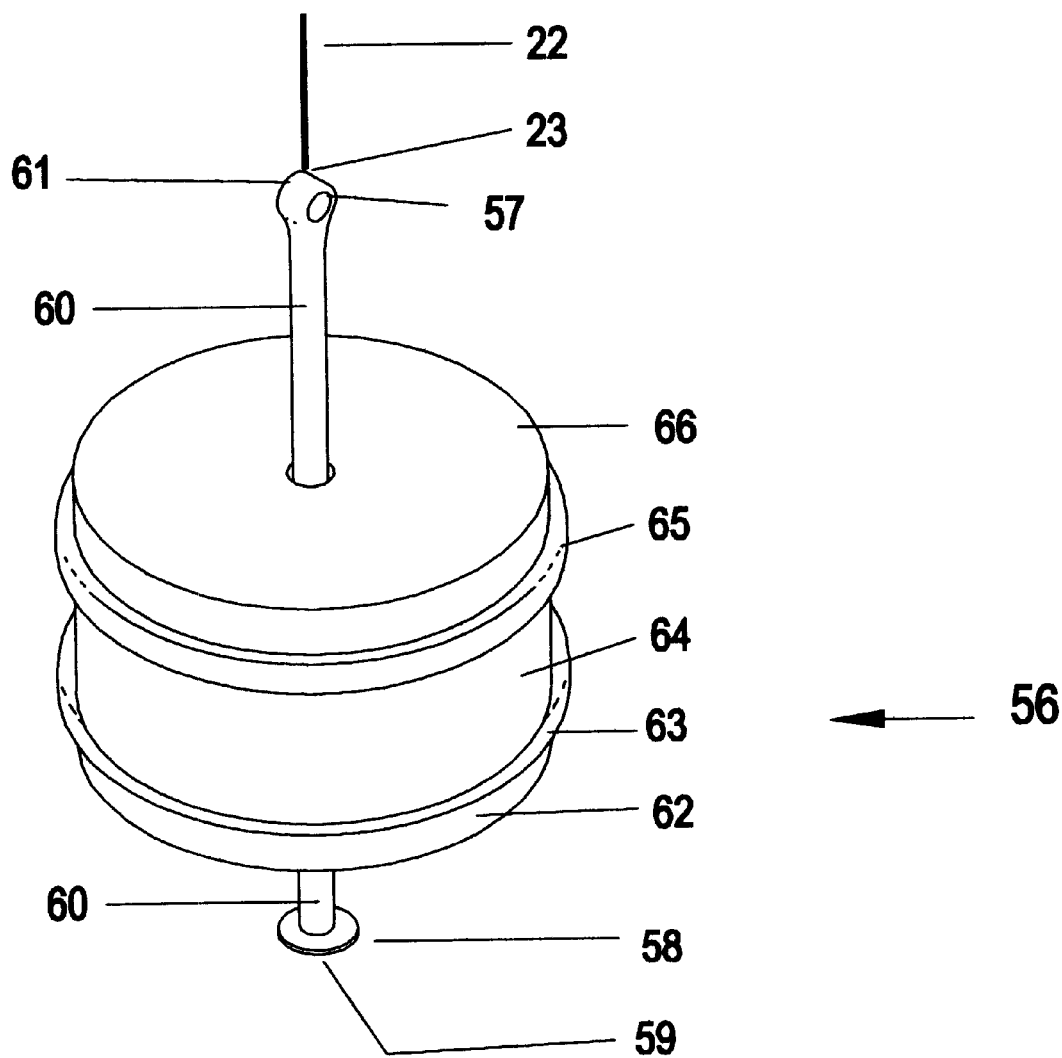
Figure 7B:
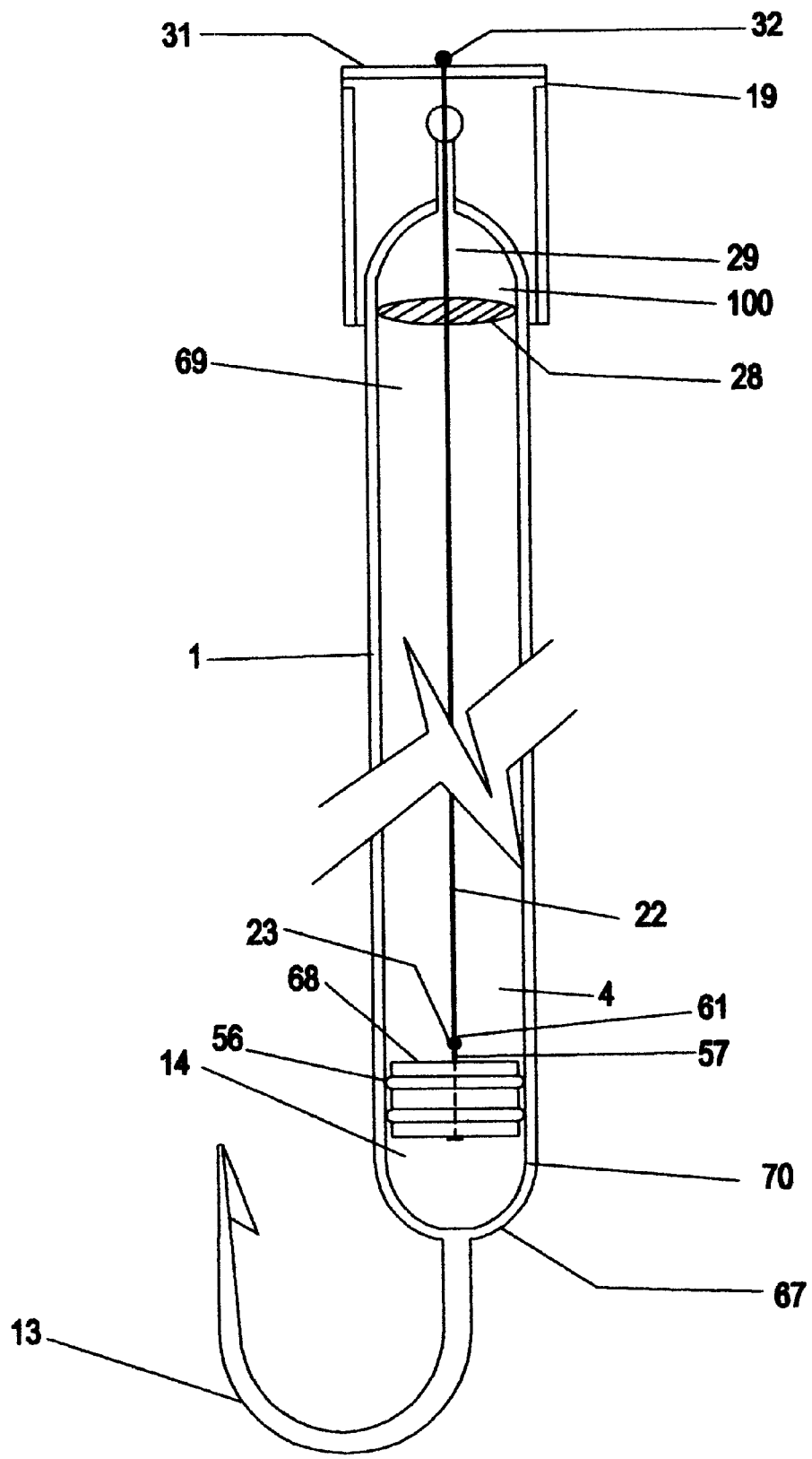
Figure 7C:
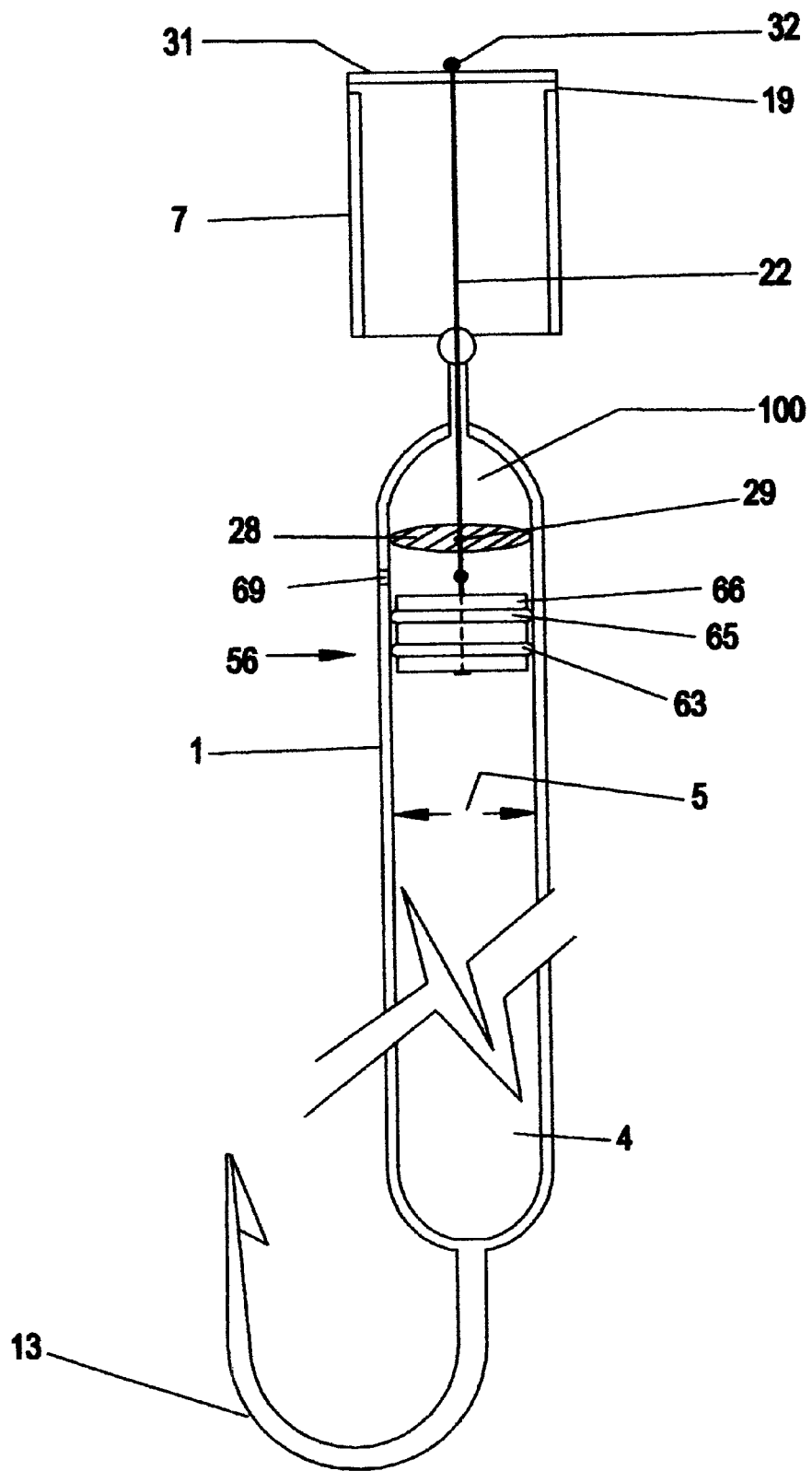

FIGS. 7A, 7B, and 7C illustrate a second alternate shock absorbing means in which pneumatic pressure generated is employed as the a shock absorber.

Figure 8:
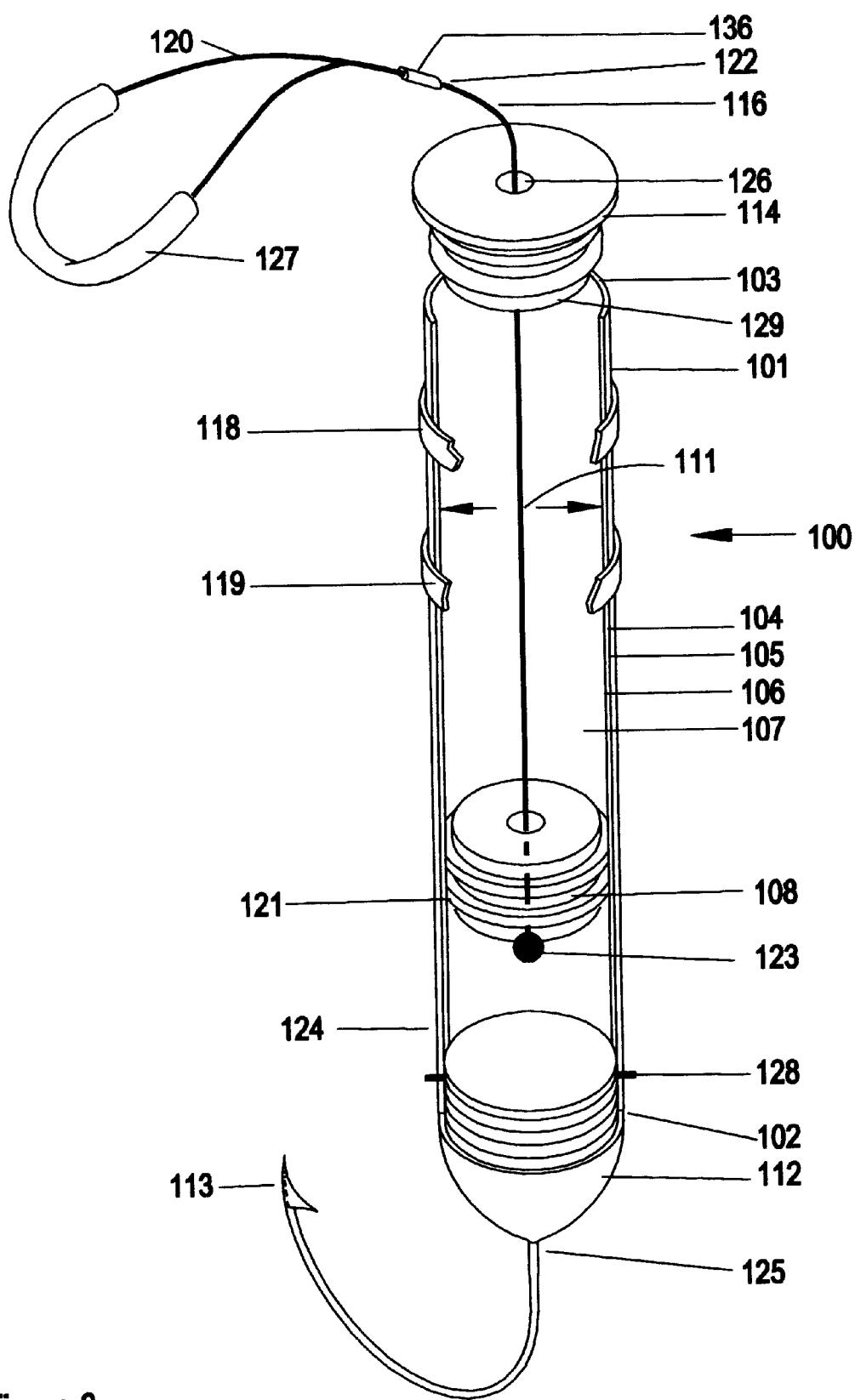

FIG. 8 provides a cross section diagrammatic view of a gaff comprising a single staff element with an impact activated shock absorbing means.

Figure 9:
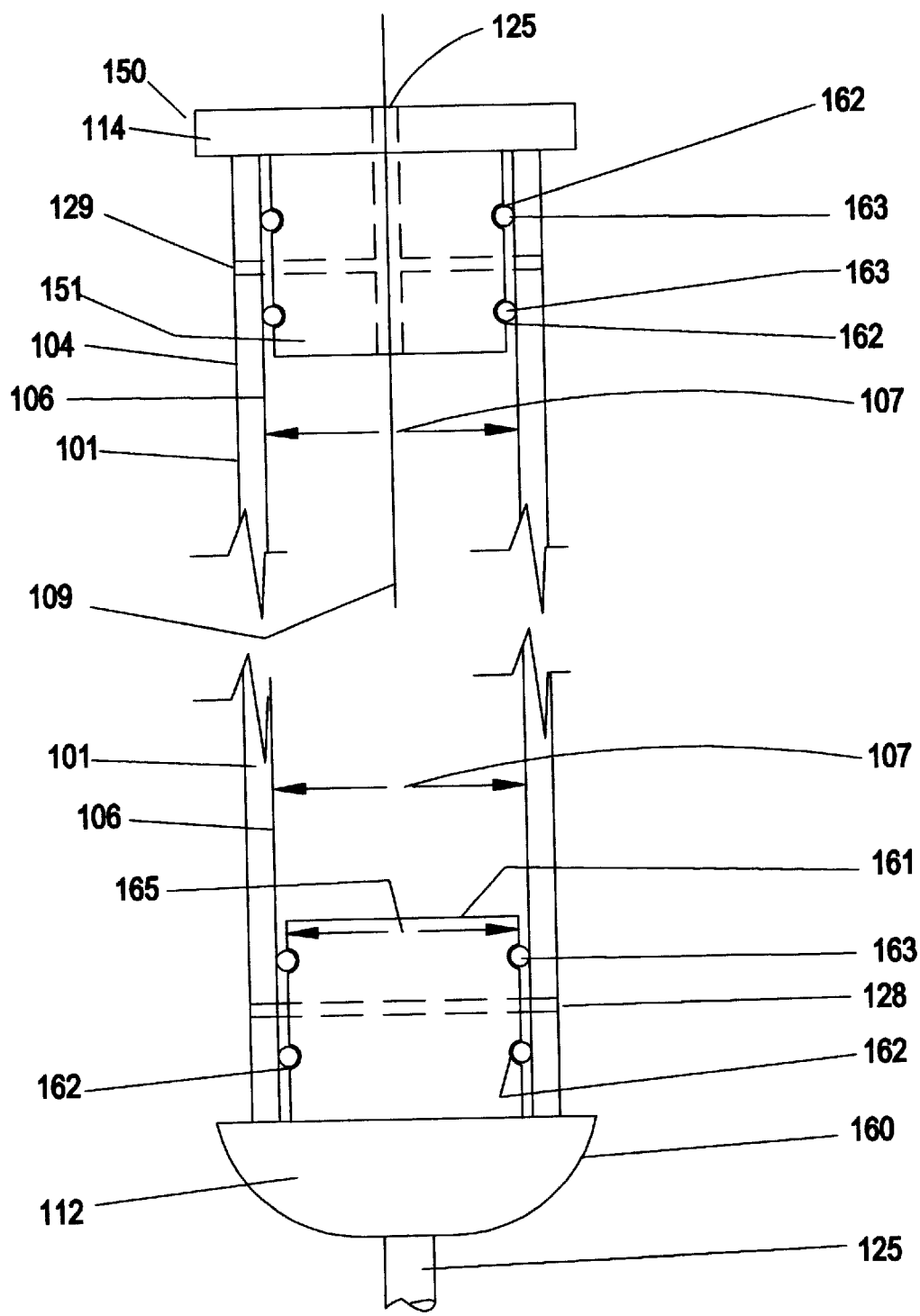

FIG. 9 provides essential details of the distal and proximal plugs of the gaff described in FIG. 8.

Figure 10:
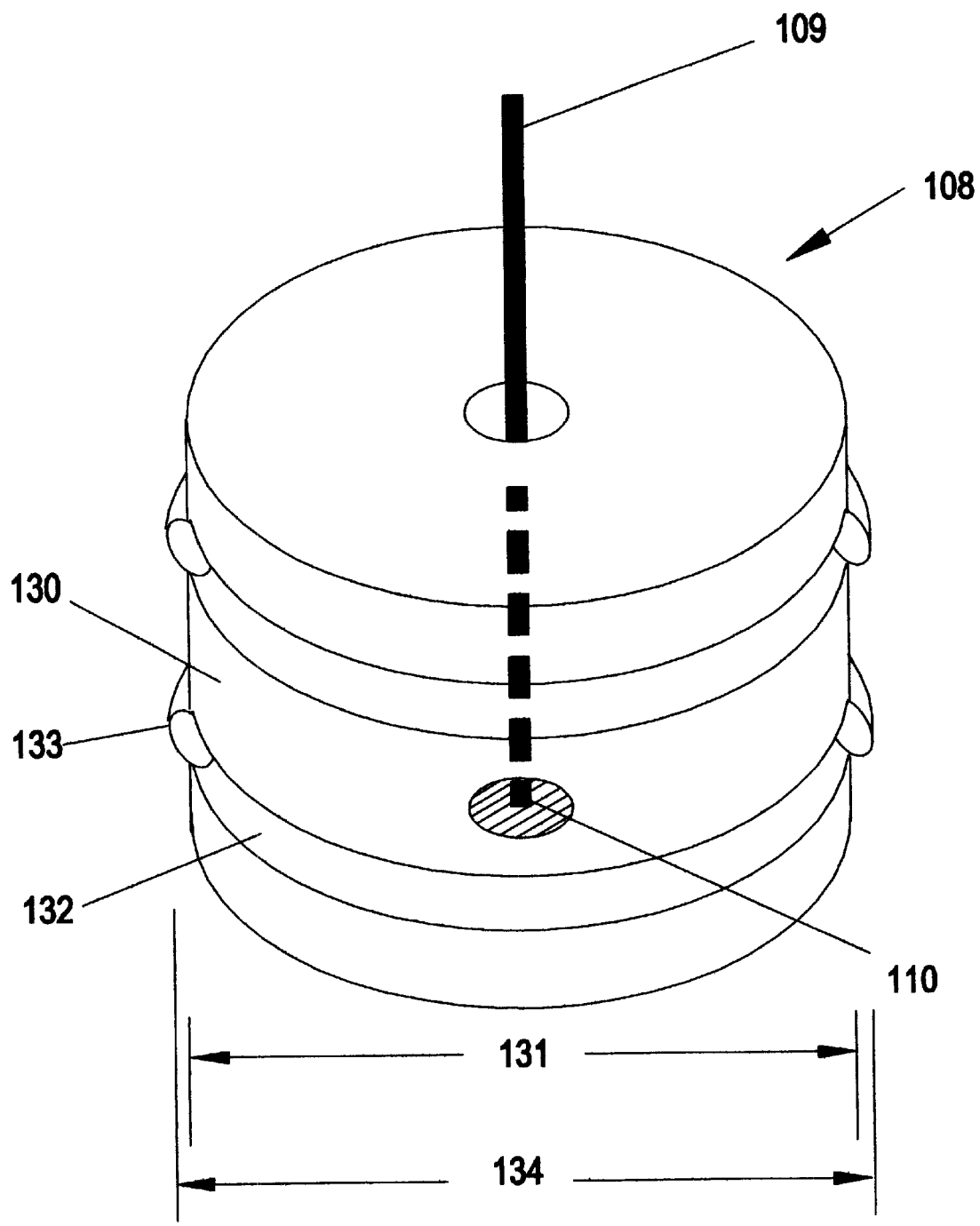

FIG. 10 provides detail of the major element of the shock absorbing means.

DETAILED DESCRIPTIONS OF THE PREFERRED EMBODIMENTS

Detailed Discussion of Drawings

FIG. 1. The staff portion 33 of the said shock absorbing gaff comprises a tubular lower handle unit 1 with an outer surface 2, an inner surface 3 and a first hollow, longitudinal core 4 limited or defined by said inner surface 3, said hollow core 4 has an inner diameter 5 and said lower handle unit has an outer diameters 6. Said staff portion 33 further comprises a tubular upper handle unit 7 with an outer surface 8, and inner surface 9, and a second hollow, longitudinal core 10 limited or defined by said inner surface 9 with an inner diameter 12 and an outer diameter 11.

A hook device 13 is permanently secured to the distal end 14 of said lower handle unit 1 which also has a proximal end 15. The proximal end 15 of the lower handle unit 1 is adapted to mechanically secure by threads a stem and sphere structure 100 comprising a stem element 35, a sphere element 36, and a distally positioned base plate 28 which provides the region of attachment of the stem and sphere structure 100 to the proximal end of the lower handle unit 1. In addition, the stem and sphere structure 100 has a longitudinal channel 29 extending its full length and adapted for the movement of a flexible cable 22 through the longitudinal channel 29. The stem element 35 and sphere element 36 comprise part of a latch device 16.

A physically compressible, anatomically shaped material is adhesively attached to said outer surface 8 of said upper handle unit 7 to form the upper handle unit release grip 17. The proximal end 18 of said upper handle unit 7 is closed by a latch device base 19.

The shock absorbing mechanism 20 positioned in said hollow, longitudinal core 10 of said lower handle unit 1 comprises a compressible, coil spring 21 with a flexible cable 22 passed directly through the center of said compressible, coil spring 21 and forming a longitudinal axis of said spring 21. At the distal end 23 of said flexible cable 22 and the distal end of said compressible, coil spring 24, a circular base plate 25 is attached 26 to said flexible cable 22 thereby forming a moveable base for said compressible, coil spring 21.

At the proximal end 15 of the lower handle unit 1, the stem and sphere structure 100 is mechanically secured to the lower handle unit 1 so that the proximal end 27 of the compressible coil spring 21 is positioned against the stem and sphere base 28. Thus the bottom of the stem and sphere base 28 is the upper limit for compression of the compressible coil spring 21. The flexible cable 22 passes through the stem and sphere structure 100 by means of the channel 29 and extends through the upper handle unit 7 and ultimately is anchored to the exterior of the upper handle 7 unit by a retaining device 31.

FIG. 1 further reveals that the inner diameter 11 of the upper handle unit 1 is greater than the outside diameter 6 of said lower handle unit 1 thereby allowing said lower handle unit 1 to fit inside said upper handle unit 7.

FIG. 2 reveals the details of the latch device 16 that holds said lower handle unit 1 in position when inserted into said upper handle unit 7 until the latch device 16 is manually released to deploy said shock absorbing mechanism 20, and said lower handle unit 1 is pulled free from direct contact with said upper handle unit 7. The flexible cable 22 maintains secure physical connection between said upper handle unit 7 and said lower handle unit 1. In the best mode contemplated and illustrated in FIG. 2, the stem and sphere structure 100 serves to close the lower handle unit 1, and the sphere element 35 with the associated stem element 36 is part of the latch device 16.

Said latch base 19 is securely fixed to the proximal end 18 of said upper handle unit 7. An opening 34 in the center of said latch base 19 allows the sphere element 35 of the stem and sphere structure 100 to pass freely through the latch base 19.

A slidable lock element 37 which, when in position with respect to said sphere 35, holds the lower handle unit 1 in its locked position, inserted in the upper handle unit 7 is positioned on top of said latch base 19. The slidable lock element 37 has in its center a release region 38 with a center slot 39, the width of which is less than the diameter of said sphere 35 and greater than the diameter of said stem 36 and a circular opening 40 at either end, the diameter of which is slightly greater than the diameter of said sphere 35. Travel slots 41 of equal length and of a length slightly greater than the total length of said release opening 38 are positioned at each end of the slidable lock element 37. Fasteners 42 comprising a cap element 44 and a shank element 43 slightly less in diameter than the width of said travel slots 41 pass through said latch base 19 and are structurally secured said upper handle unit 7. The cap element 44 holds said slidable lock element 37 movably, but firmly to said latch base 19. Both ends of said slidable lock element 37 are bent at right angles downward to form a flange 45. Each flange 45 is embedded in the upper handle compressible release grip 17. The flexible cable 22 is firmly attached to a restraint device 31. The restraint device 31 is attached to the top of each of said cap elements 44.

FIG. 2 depicts the gaff device in its locked or closed position. The slidable lock element 37 is centered on said latch base 19. As a result, said sphere element 35 and stem element 36 are centered in said release region 38 and each fastener 42 is centered in its travel slot 41.

FIG. 3 depicts said slidable lock element 37 moved as a result of manual force applied to said flange 45. The sphere 35 is positioned in direct alignment with said circular openings 40 in said slidable lock element 37. Movement of said slidable lock element 37 also causes the relative position of said fasteners 42 to change in travel slots 41.

FIG. 4 illustrates said gaff device as it would appear in use with the lower handle unit 1 separated from the upper handle unit 7 and the two units connected by the shock absorbing mechanism 20. Operator secures upper handle unit 7 in a relative fixed position. As a result of force of impaled fish away from operator, the lower handle unit 1, is moved away from the upper handle unit 7 when the slidable lock element 37 is released by manual pressure on the flange 45 and resulting movement of the slidable lock element 37. With the proximal end of said flexible cable 22 fixed to said upper handle unit 7, movement of lower handle unit 1 causes compression of said compressible coil spring 21 as relative force on said circular base plate 25 is opposite force of impaled fish and the movement of said lower handle unit 1. Compression of said compressible coil spring 21 dissipates energy of the struggling, impaled fish.

FIGS. 5A and 5B illustrate a top view and a side view, respectively, of an alternate latch device anticipated by the invention. The proximal end 18 of said upper handle unit 7 is closed by a plug piece 46. The proximal end of said flexible cable 22 is secured in the center 73 said plug piece 46. A latch ridge 47 is positioned on the outer surface of said lower handle unit 1. An alternate latch device 48 is pivotly mounted on the outer surface 8 of said upper handle unit 7. Brackets 49 are positioned on and securely attached to said outer surface 8 of said upper handle unit 7, and axle brackets 50 are positioned on the lower surface of said alternate latch device 48. An axle 51 passes through said brackets 49 and said axle brackets 50 attaching said alternate latch device 48 to said upper handle unit 7 and forming a pivot point for said alternate latch device 48. A second compressible spring 52 connects proximal end of said alternate latch device 48 by its lower surface to the outer surface 8 of said upper handle unit 7. In an extended (uncompressed) state, said second compressible spring 52 holds said proximal end of said alternate latch device 48 in an elevated position with respect to the outer surface 8 of said upper handle unit 7. The proximal end of said alternate latch device 48 is bent downward in a flange 53 and when said proximal end is raised, said flange 53 is lowered and hooks over said latch ridge 47, thereby locking said lower handle unit 1 securely, but releasable to said upper handle unit 7. When said second compressible coil spring 52 is manually compressed by pressure on said latch device 48, said flange 53 is raised above said latch ridge, releasing said lower handle unit 1 from said upper handle unit 7. A capped pin 71 is positioned in a slot 72 in the alternate latch 48. The capped 71 pin is anchored on the upper handle unit 7 and restricts the maximum movement of the alternate latch 48 when it is manually released.

FIGS. 6A, 6B, and 6C describe a first alternative shock mechanism. FIGS. 6A and 6B illustrate the gaff device in the closed or locked configuration (FIG. 6A) and in the open, extended configuration (FIG. 6B) as it might appear in the unlocked configuration with pressure downward on the hook device 13. FIG. 6C illustrates the details of a length of elastic material 55 inserted interstitially in the flexible cable 22 that stretches when the upper handle unit 7 is unlatched from the lower handle unit 1, and the lower handle unit 1 moves down and away from the upper handle unit 7 when pressure or force is applied to the hook device 13. The force causes the elastic material 55 to stretch, and the resistance to stretching characteristic of elastic materials dissipates the energy thereby serving as the shock absorbing mechanism.

The shock absorbing device is simplified from the shock absorbing device of FIG. 1 (20). As described in FIG. 1 and illustrated also in FIGS. 6A and 6B, a flexible cable 22 with its proximal end 32 securely attached to a cable retraining device 31 passes through the longitudinal channel 29 of the stem and sphere structure 100. A length of elastic (stretchable/retractable) material is inserted interstitially in the flexible cable 22. The distal end 23 of the flexible cable 22 is firmly anchored to the interior of the distal end 14 of the lower handle unit 1.

FIG. 6C illustrates the insertion of the elastic material 55 interstitially in the flexible cable 22. Grommets 56, or other means known to those skilled in the art, are positioned in the elastic material 55 to prevent the flexible cable 22 from tearing the flexible material when force is exerted on said flexible cable 22.

When pressure or downward force is removed from the hook device 13, the stretched, elastic material 55 contracts to its normal length, and the lower handle unit 1 may be returned to its locked configuration, inserted in the upper handle unit 7.

This alternate shock absorbing means does not affect the practical use of the gaff device or manual operation of the release of the latch mechanism. Any person of average skill in the art could properly manipulate the gaff device with the alternative shock absorbing means.

The function of the alternative device is relatively simple. When manual pressure is exerted to release the latch and thereby release the lower handle unit 1 from the upper handle unit 7, and the latter is held relatively in place, force, or downward pressure on the hook device 13 from a struggling, impaled fish causes the lower handle unit 1 to move down the flexible cable 22, away from the upper handle unit 7. This movement is allowed by the stretching of the elastic material 55 inserted interstitially in the flexible cable 22. The elastic material 55 thus serves as a shock absorber for energy exerted against the hook device 13.

FIG. 7A illustrates details of an expandable piston element 56 comprising a central axle 57 said axle 57 being threaded on its distal end 58 to receive a pneumatically sealing nut 59, a shank portion 60, and a proximal end 61 adapted to anchor the distal end 23 of the flexible cable 22. A first metal disk 62 the diameter of which is the same as the inside diameter of the lower handle unit 1 (FIG. 1, 5) is positioned on the central axle 57 resting on the pneumatically sealing nut 59 which is tightened onto the distal end 58 of said central axle 57. A first, expandable sealing gasket 63 is centered over the central axle 57 and rests on the upper surface of the first metal disk 62. A second metal disk 64 with dimension identical to those of the first metal disk 62 is centered over the central axle 57 and rests on the upper surface of the first, expandable, sealable gasket 63. A second expandable gasket 65 with dimensions identical to the first expandable sealable gasket 63 is positioned on the upper surface of the second metal disk 64. A third metal disk 66 with dimensions identical to the first and second metal disks 62 and 64, respectively, is positioned on the upper surface of the second expandable gasket 65. Each of the above disks and gaskets has an opening in its center so that each is centered on the central axle 57 with the central axle 57 extending through each disk and gasket.

FIG. 7B illustrates the gaff device in its locked configuration. The hook element is rigidly attached to a closure plug 67. The distal 23 end of the flexible cable 22 is anchored to the proximal end 61 of the central axle 57. The flexible cable 22 extends the length of the lower handle unit 1 passing through the longitudinal channel 29 of the stem and sphere structure 100. The flexible cable 22 continues passing through the upper handle latch base 19 and being anchored at 32 to the cable restraining device 31. The expandable piston element 56 is inserted into the longitudinal core 4 at the distal end 14 of the lower handle unit 1. The closure plug 67, threaded to effect an air tight seal at the distal end 14 of the lower handle unit 1, is secured to the distal end 14 of the lower handle unit 1 by threaded means 70, creating an air-tight chamber in the longitudinal core 4 limited by the expandable piston element 56 and the closure plug 67. A partial air-tight chamber is also formed between the expandable piston element 56 and the base 28 of the stem and sphere structure 100 in the longitudinal core 4 of the lower handle unit 1. The diameter of the longitudinal channel 29 in the stem and sphere structure 100 is minimal, to allow free movement of the flexible cable 22, but to restrict air flow from the longitudinal core 4.

FIG. 7C illustrates the gaff device in its unlocked or open configuration with the lower handle unit 1 separated from the upper handle unit 7. With the upper handle unit 7 held essentially in one position, as force is applied to the hook device 13, the lower handle unit 1 moves downward. This effectively moves the piston element 56 upward in the longitudinal core 4 of the lower handle unit 1. This relative movement compresses the air between the expandable piston element 56 and the stem and sphere base 28 and generates a resistance to the downward movement of the lower handle unit 1. Simultaneously, a vacuum is created below the expandable piston element 56 which also tends to resist movement of the lower handle unit 1. Thus, the expandable piston element 56 serves as a shock absorbing device. The relative movement upward of the piston element 56 generates a force on the top surface of the third metal disk 66 thereby tending to compress the piston element 56 and specifically laterally expanding the expandable gaskets 63 and 65 to form a pneumatic seal with the longitudinal core 4 of the lower handle unit 1. Air pressure is slowly released through the longitudinal channel 29 in the stem and sphere structure 100 or through a pressure release valve 69 positioned immediately below the stem and sphere base 28 on the lower handle unit 1.

By way of example, but not limitation, the expandable gaskets 63 and 65 may be made of soft rubber or any similar, durable synthetic or natural material. The diameter of the gaskets must be essentially the same as or slightly larger than the inner diameter 5 of the lower handle unit 1, and the thickness of the material may vary from, but is not limited to 0.50 cm to 2.00 cm.

FIG. 8 describes the structural and functional elements of the gaff device 100. The gaff device 100 comprises a staff 101 with a distal end 102, a proximal end 103, a wall 104 with an outer surface 105 and an inner surface 106. The inner surface of the wall 106 defines the open,longitudinal core of the staff 107.

A plunger element 108 with an outer perimeter 121 is inserted into the distal end 102 of the staff 101. A flexible cable 109 with a proximal end 122 and a distal end 123 extends the length of the longitudinal core of the staff 107. The distal end of the cable is firmly attached to the plunger. A distal plug 112 is positioned in the distal end 102 of the staff 101 and held in place by a pin inserted through the wall and traversing the distal plug and being physically secured on opposite sides of the wall. A hook 113 is firmly anchored to the distal apex 125 of the distal plug 112.

A proximal plug 129 is positioned in the proximal end 103 of the staff 101 and held in place by a pin inserted through the wall and traversing the proximal plug 129 and being physically secured on opposite sides of the wall. The flexible cable 109 passes through an aperture 126 in the proximal plug and extends beyond the proximal end of the shaft 103, forming a loop 127 with the proximal end of the cable 122 secured with a clamp device 126 at a point on the cable 109 above the aperture 126. A tightly fitting sleeve element 120 is fitted around the distal portion of the loop 127. A first grip surface 118 and a second grip surface 119 is applied to the outer surface of the staff 101.

FIG. 9 describes the details in cross section diagrams of the distal plug 112 and the proximal plug 114. The distal plug comprises a cap 160 and a shank element 161. The diameter of the shank element 165 is less than the diameter of the open core of the staff 107. A plurality of parallel, horizontal grooves 162 capable of securing o-rings 163 is formed on the shank element 165. The o-rings 163 are positioned so as to form the outer perimeter of the distal plug 112 and so that as such they contact and form an air-tight seal with the inner surface 106 of the wall of the staff 101.

Elasticity of the o-rings helps hold them in place. A pin 128 passes through the wall 104, traverses the distal plug and passes through the opposite wall and secures the distal plug 112 in position. The pin is positioned to pass between any pair of o-rings.

The proximal plug 114 comprises a cap 150 and a shank element 151. The diameter of the shank 151 is less than the diameter of the open core of the staff 107. A plurality of parallel, horizontal grooves 162, capable of securely holding o-rings is formed in the shank element 151. The o-rings are positioned so as to be the outer perimeter of the proximal plug 114 and so that as such they contact the inner surface of the wall 106 and form an air-tight seal with that surface. Elasticity of the o-rings helps hold them in position. A pin 129 passes through the wall of the staff 104, traverses the proximal plug 114 and passes through the opposite wall securing the proximal plug in the staff 101. The pin is positioned to pass between any pair of o-rings and is off-set to avoid passing through the aperture 125 or contacting the flexible cable 109.

FIG. 10 provides details of an embodiment of the plunger 108, a key element of the shock absorbing means. Flexible cable 109 is firmly attached at or near the top 110 of the cylinder 130. A plurality of horizontal, parallel grooves 132 is formed around the circumference of the cylinder so as to accommodate and hold o-rings 133. The outer perimeter and diameter of the plunger 134 are established by protrusion of the o ring, thus the diameter of the plunger 134 is greater than the diameter of the cylinder 131.

EXAMPLES

Manufacture

With the essential parts disclosed in detail and their functions similarly described, reference is made again to FIGS. 1 through 10 to supplement the following disclosure of a best mode to make the shock absorbing gaff. Certain dimensions as to size are for illustrative purposes only, not limitations. Size of the functional unit effectively is limited only by the size and strength of the user and the maximum anticipated size of fish to be taken using the gaff device. Similarly, specific materials may vary, and those described herein are offered for illustrative purposes only, not as limitations. The invention anticipates the use of a wide variety of metal and non metallic materials.

Example One

In a best mode contemplated following the structures described in FIGS. 1,2,3, and 4, the lower handle unit is made from a length of a light metal pipe or similar material, although a variety of plastic materials may be suitable. The length of the lower handle unit 1 may vary from 0.6 m to over 2.0 m, with a preferred range of 1.0 m to 2.6 m. The length of the lower handle unit determines the maximum length of the shock absorbing device (spring) that can be used which in turn determines the maximum surge distance the device can control.

The outside diameter of the lower handle unit may vary from 2.5 cm to 10.0 cm, with a preferred range of 2.5 cm to 5.0 cm. The wall thickness must be adequate to stand the stress placed on the shock absorbing device and to provide suitable points for securing the stem and sphere structure. The hook device is fixed to the distal end of the handle and the distal end closed by tapering it or with a plate to which the hook is fixed. The shank portion of the hook may vary from 5.0 cm to 25.0 cm inches, but is not limited to this range, and the size of the hook is determined by the radius of a circle the hook would describe and may vary, but is not limited to a range of from 7.5 cm to 15.0 cm.

The upper handle unit is made of material similar to the lower handle unit and varies in length from approximately one fourth the length of the lower handle unit to a length essentially equal the length of the lower handle unit. The preferred length of said upper handle unit is from one sixth (⅙) to one fourth (¼) the length of said lower handle unit. The inside diameter of the upper handle unit must be slightly greater than the outside diameter of the lower handle unit to allow said lower handle to fit within said upper handle unit and provide for proper alignment of the stem and sphere portions of the latch release device with the slidable release mechanism.

The stem and sphere structure positioned at the proximal end of the lower handle unit may be milled onto said lower handle unit. A more practical approach is to produce the stem and sphere as a single, separate part with the base section stem threaded to fit a receptacle means on the lower handle unit and fit the end of the lower handle unit with a female threaded means capable of receiving and securing the threaded end of the base section. The stem and sphere structure must be of such size as to allow a longitudinal channel of adequate dimension for the flexible cable to move freely through it while maintaining adequate strength of the stem and sphere structure. One skilled in the art can determine these dimensions without undue experimentation.

A flexible metal cable or a flexible cable of similar material and durability, the length of which exceeds the combined lengths of the lower handle unit and upper handle unit forms the central axis of the shock absorbing device. A metal disk that is the slightly less in diameter than the inside diameter of the lower handle unit is fixed at the center point of its horizontal plain to one end of the cable. A compressible coil spring is positioned over the cable such that one end of the spring rests on the disk and the cable acts as a central axis of the spring. The uncompressed spring generally will be 5.0 cm or less than the length of the handle. The force required to compress the spring may vary from 5.0 kg to 100 kg with the preferred range of 10.0 kg to 70.0 kg. The tensile strength of the cable is at least equal to the force required to compress the spring and generally should exceed the weight of any fish the gaff device might be used to take. Tensile strength in the range of 5.0 kg to 125 kg is acceptable, but not a limit.

The shock absorbing device is inserted into the handle with the disk at the distal (lower or bottom) end. The cable extends the full length of the gaff device, and the proximal end of the cable is fastened securely to the exterior of the upper handle unit by means of a cap or plate.

The lower handle unit is physically held to the upper handle unit by a manually releasable latch mechanism which comprises three major parts: the stem and sphere structure positioned on the proximal end of said lower handle unit, the lock mechanism base positioned as the top of the upper handle unit and the slidable release mechanism positioned on the top surface of said lock mechanism base.

Said lock mechanism base is securely fastened to the upper handle unit by any of a variety of means all of which are well known to those skilled in the art. A opening in the center of said lock mechanism base allows said stem and sphere structure to extend above said lock mechanism base.

Said slidable release lock mechanism is fashioned from a metal piece and comprises three essential features. An opening is centered in the face of said release mechanism. The opening comprises a slot portion the width of which is slightly greater than the diameter of said stem. Each end of said slot portion terminates in a circular opening, the diameter of which is greater than the diameter of said sphere. The openings may be beveled inward. Travel slots are formed at each end of the release mechanism and capped pins the diameter of which is slightly less than the width of said slots are inserted through the slots and attached to said upper handle unit. The caps of said pins hold said latch slidable release mechanism in place while allowing it to move laterally the length of the slots. The slots are formed in alignment with the longitudinal axis of the opening through which the sphere element protrude. The slidable release latch mechanism is positioned such that when the lower handle unit and upper handle unit are held by said latch mechanism, each of said capped pins is positioned equidistance from each end of the slot in which it is located and that distance is at least equal to the distance from the center of the slot in which the sphere element is located to the center of the circular openings at each end of the center slot.

Each end of said slidable release mechanism extends beyond said slots to form an elongated flange that is bent downward to contact the outter surface of the upper handle unit and embedded in the compressible covering of said upper handle release grip. The flange is positioned so that when the release grip is compressed, pressure is transferred to move the slidable release mechanism so that said sphere is oriented in either of the circular openings and downward force applied to the hook will cause said sphere to be moved downward through said circular opening thereby releasing the lower handle unit from direct contact with the upper handle unit and effectively activating the shock absorbing device.

Because the flexible cable is fixed to the upper handle unit and connected to the plate at the distal end of the compressible spring and the proximal end of the spring is secured against stem and sphere base in the lower handle unit, as the lower handle unit is pulled away from the upper handle, the spring is compressed, thereby dissipating the energy. The spring action allows the shock absorbing device to continuously dissipate energy from an impaled fish. When force is no longer exerted on the hook, the lower handle unit and upper handle unit may be relocked for further use.

The initial, practical application or use of the releasable gaff device is similar to devices typical of prior art. With the gaff device in its locked configuration, the user swings the device in a short arc with the hook pointed towards the fish to be impaled thereon. When the fish is successfully impaled, if it struggles and is difficult to land, manual pressure is applied to the lock release mechanism by squeezing it, the two handle units separate thereby employing the shock absorbing device, and the shock absorbing device serves to dissipate energy thereby reducing the danger of the hook being pulled free from the fish or of the gaff device being pulled from the hands of the user.

The unit can be used as a gaff typical of the prior art simply by declining to release the latch device. Using both hands on the lower handle unit reduces pressure on the release mechanism.

Example Two

In a second example, the cable, disc and spring shock absorbing device are replaced by an elastic material inserted interstitially in the cable as follows. A cable is attached to the hook end of the handle extending the full length of the lower and upper handle units ultimately being secured to the proximal end of the upper handle unit. In a portion of the cable located in the lower handle unit, a piece of the cable is removed and replaced by a piece of elastic material. The length of the inserted, interstitial elastic material varies as a function of its elasticity. The maximum length to stretch is fixed by the length of said lower handle unit. The unstretched length of the elastic material should be as short as possible to allow the maximum play and shock absorbance when the lower handle unit separates from the upper handle unit as a result of releasing the latch device. The force required to stretch the elastic material ranges from less than 3.0 kg to over 25.0 kg, with a preferred range of 4.0 kg to 10.0 kg. In this application, the elastic material must be inserted interstitially into the cable and the cable fixed to the distal end of the handle before the hook is fixed to the handle and the handle section closed. Other features of the gaff device are as described in Example One.

Example Three

In this case, the cable, disk, and spring shock absorbing device of Example One are replaced with a pneumatic system. An air tight disk structure, or piston, is inserted into the lower handle unit. A flexible cable is firmly attached to the piston, and the disk is positioned at the distal end of the lower handle unit. The proximal end of the lower handle unit is shaped to fit into said upper handle unit and is closed with a cap device that is virtually air tight and has a channel through which the flexible cable passes through the cap device and into the upper handle unit. The flexible cable is fixed to the exterior of said upper handle unit in a manner appropriate to the releasable locking mechanism used. When the locking mechanism is released, the lower handle unit moves downward and, with the upper handle unit held in a relatively constant location, the effect of the movement of the lower handle unit is an opposite (upward) relative movement of the piston. This movement generates pressure above and creates a vacuum below the piston. The pressure due to the piston movement in the lower handle unit acts as a shock absorber. Pressure is equalized ultimately because the opening for the flexible cable in said cap device is not absolutely air tight. Other features of the gaff device are as described in Example One.

Example Four

Extension of the gaff device by separation of the the lower handle unit from the upper handle unit, irrespective of any shock absorbing function, is a significant asset of the device. The invention anticipates a device with either latch mechanism previously described, and with the elastic material described in Example Two replaced simply by extra length of the flexible cable. Such extra length may be one half or more of the length of the upper handle unit, but this length is an example, not a limitation. When the lower handle unit is released from the upper handle unit, the device without the resistance induced by any of the described shock absorbing means, may elongate a length equal to the extra length of the flexible cable. This elongation allows one of average skill in the art an added opportunity to play a fish impalled on the hook element, without the benefit of the shock absorbing means, until the fish can be safely landed.

Best Anticipated Mode of Use

Regardless of the method of manufacture, type of shock absorbing means, or the specific release mechanism, the anticipated best mode to use the gaff device is effectively the same. The use starts with the gaff device in the closed or locked position: the lower handle unit inserted in the upper handle unit and the lock mechanism holding these in the locked configuration. The mode anticipates the use of both hands.

The lower hand is held closest to the hook (distal) end of the device, but may be grasping either the lower handle unit or the upper handle unit. The upper hand grasps the upper handle unit near the compressible release material. One skilled in the art would understand this simple positioning.

When a fish is brought along side of the boat, pier or shore to be landed, the user manipulates the device as any similar gaff device known in the prior art might be manipulated so as to hook or impale the fish on the hook element of the gaff device. One skilled in the art of sport or commercial fishing would understand how to manipulate the device to impale the fish.

If not before, if necessary, when a fish is impaled on the hook, the user grasps the upper handle unit, frequently by sliding the lower hand upward from the lower handle unit to the upper handle unit. The upper hand similarly is moved to the compressible release material. By grasping and squeezing the compressible release material, the latch mechanism is unlocked and the shock absorbing means is activated to dissipate energy from said impaled fish. When the fish is landed, the device can be returned to its locked position ready again for use.

Example Five

An additional purpose of the invention is a gaff device comprising a single staff element with shock absorbing capabilities similar to those described for previous embodiments.

It is a further purpose of the invention that the shock absorbing means be activated in response to a force applied to a hook without action by the user to activate the shock absorbing means. Reference to FIG. 8 reveals a gaff 100 comprising a single staff and a shock absorbing means that may be activated in direct response to a force applied to the hook.

The gaff 100 of FIG. 8 comprises a single staff and a shock absorbing means. The staff may be of variable length from 1 m to 6 m with a preferred length of 1.5 m to 2.5 m. Practical use limits the maximum length. The staff structure is a hollow tube made from a light weight, durable material. In a preferred embodiment, the material is aluminum, but the invention anticipates other metals, composites, and plastics. The outside diameter of the staff varies from 2.0 cm to 10 cm with a preferred range of 2.5 cm to 7.0 cm. These dimensions are given as reasonable illustrations, not as limitations. In a preferred embodiment, the staff is fabricated from T8-32 60/63 composite aluminum (Penn Aluminum, Inc., Murphysboro, Ill.). Wall thickness of the material is about approximately 1.27 mm. The corresponding inside diameter of the tube is approximately about 22.86 mm. The inside surface of both the distal end and the proximal end of the staff are adapted to the insertion of a distal plug and a proximal plug, respectively.

As illustrated by reference to FIG. 8 and FIG. 9, a plug is inserted into the distal end of the staff. The plug comprises a solid cylinder 130, the plug being adapted with plurality of grooves to secure o-rings in equally spaced, horizontal orientation to the longitudinal axis of the plug and the staff. In one embodiment, the cylinder is made of aluminum. The invention anticipates plugs fabricated from a variety of metallic and nonmetallic materials. The diameter of the cylinder is fractionally less than the diameter of the staff, and the grooves are fashioned such that o-rings positioned in the grooves contact the inner surface of the wall of the staff and form an air-tight seal with that surface. A flexible cable is securely attached to the plunger at a point at or near the top of the plunger. Together the plunger with o-rings and flexible cable attached to it comprise the shock absorbing means.

The flexible cable extends the full length of the staff and passes through an aperture in the proximal plug. The proximal end of the cable forms a loop 127 and is securely attached to the cable 116. A grip sleeve 120 is positioned at the distal end of the loop. The diameter of the loop is variable, but the loop is large to easily fit over the hand and lower arm of an average adult. The grip sleeve fits securely on the cable and varies in length, by way of illustration, not limitation from 25 cm to 50 cm in a preferred embodiment. The proximal plug is designed to fit frictionally tight into the proximal end of the staff, and when secured with a pin, the proximal plug forms an air-tight seal between core of the staff and external environment.

A hook is secured to the distal plug, and the distal plug in the same manner as the proximal plug is positioned in the distal end of the staff. The distal plug fits frictionally tight in the distal end of the staff and when held in position with a pin forms an air-tight seal between the core of the staff and external environment.

With the gaff device fully assembled, the core of the staff comprises two, air-tight chambers separated by air-tight seals. The lower chamber is formed by the distal plug and the plunger, and the upper chamber is formed by the plunger and proximal plug.

Grip surfaces are applied in two regions of the staff, the first grip surface near the proximal end of the staff and the second grip surface near the middle of the staff. The length of the grip surfaces is variable, but ranges from but is not limited to 25 cm to 50 cm. The grip surface may be of any durable, non-slip material that is thin, but moderately compressible. Firm sponge rubber is used in a preferred embodiment.

The actual use of the device is apparent to one skilled in the art by its design and structure. Use is explained by way of an example identifying the right hand as the upper hand and the left hand as the lower hand. Reversing these designations has no practical effect on understanding the use of the device as also would be obvious to one of average skill in the art.

The upper hand is inserted through the cable loop and grasps the staff at the first grip surface. The second grip surface is grasped by the lower hand. Held in this manner, the device is maneuvered or manipulated in a manner so as to impale a fish. So long as the user maintains a grasp with either hand on the shaft, the shock absorbing means is non functional. If the impaled fish jerks the staff from the user's grasp, or if the user's grip is otherwise released, the loop in the cable over the user's hand and forearm prevents loss of the device and triggers the shock absorbing means. It is assumed, but not necessary that if a user released the grip on the staff, the user would immediately grasp the sleeve on the cable with one or both hands. Even if this grasping action is not immediate, with the device secured by the loop, the shock absorbing means functions. The staff moves with the impaled fish. The plug remains in a fixed position, secured by the flexible cable held by the user. As a result, the distal end of the shaft moves away from the cylinder and the proximal end moves towards the plug. Because of the air-tight seal created by the plug, this movement generates a pressure in the upper chamber of the staff and a vacuum in the lower chamber. Both the pressure and vacuum tend to resist movement, thereby affording shock absorbancy. As the impaled fish tires, the user grasps the staff by both hands, thereby by passing the shock absorbancy. The pressure is released through the aperture in the proximal plug, and the device returned to its initial state, ready again for use.

It is obvious that the shock absorbing means comes into operation when the shaft is released by the user, and control of the gaff is limited to the loop in the cable over the user's hand. This release could be in response to a sudden, unexpected jerk by an impaled fish, or it could be intentional by the user. In either situation, the force of an impaled fish automatically triggers the shock absorbing means, thereby reducing the chance of loosing the fish, or loosing or damaging the gaff. A best mode does anticipate that a user, upon loosing the grip on the staff would immediately grasp the sleeve, but this is not essential to successful use of the device.

The foregoing description of preferred embodiments of the invention has been presented for illustration, and is not intended to be exhaustive. Modifications are possible in light of the above teachings or may be acquired from practice of the invention.

What I claim is:

1. A device to assist in landing fish comprising:
   a. a staff having a distal end, a proximal end, a length, a wall with an outer surface, and an inner surface wherein said inner surface of said wall defines an open, longitudinal core of said staff, said staff further being adapted to receive a shock absorbing means inserted frictionally tight into said distal end of said staff, and further wherein said distal end of said staff is adapted to receive a distal plug and said proximal end of said staff is adapted to receive a proximal plug;
   b. said shock absorbing means comprising a plunger with an outer perimeter, said outer perimeter contacting said inner surface of said wall and forming an air-tight seal between said plunger and said inner surface of said wall, said shock absorbing means further comprising a flexible cable, said flexible cable having a distal end, a proximal end, and a length, wherein said distal end of said flexible cable is attached to said plunger and further wherein said flexible cable extends the length of said staff passing through a aperture in said proximal plug and extends a length beyond said proximal plug;
   c. said proximal plug being secured in said proximal end of said staff with a fastener, and said distal plug having a hook firmly anchored to its external apex, and further said distal plug being secured in said distal end of said shaft with a fastener; and
   d. said proximal end of said flexible cable extending beyond said proximal plug and terminating in a loop configuration.

2. The device in claim 1 in which a distal portion of said loop formed in said flexible cable is encased in a flexible, protective sleeve.

* * * * *